(12) United States Patent
Rowe (10) Patent No.: US 7,801,338 B2
(45) Date of Patent: *Sep. 21, 2010

(54) MULTISPECTRAL BIOMETRIC SENSORS

(75) Inventor: Robert K. Rowe, Corrales, NM (US)

(73) Assignee: Lumidigm, Inc., Albuquerqe, NM (US)

( * ) Notice: Subject to any disclaimer, the term of this patent is extended or adjusted under 35 U.S.C. 154(b) by 1067 days.

This patent is subject to a terminal disclaimer.

(21) Appl. No.: 11/379,945

(22) Filed: Apr. 24, 2006

(65) Prior Publication Data

US 2006/0244947 A1 Nov. 2, 2006

Related U.S. Application Data

(60) Provisional application No. 60/675,776, filed on Apr. 27, 2005.

(51) Int. Cl.
*G06K 9/00* (2006.01)

(52) U.S. Cl. ............... 382/124; 382/115; 340/5.53; 340/5.83

(58) Field of Classification Search ............... 382/115, 382/124, 125; 340/5.53, 5.83
See application file for complete search history.

(56) References Cited

U.S. PATENT DOCUMENTS

| | | | |
|---|---|---|---|
| 3,508,830 A | 4/1970 | Hopkins et al. |
| 3,854,319 A | 12/1974 | Burroughs et al. |
| 3,872,443 A | 3/1975 | Ott |
| 3,910,701 A | 10/1975 | Henderson et al. |
| RE29,008 E | 10/1976 | Ott |
| 4,035,083 A | 7/1977 | Woodriff et al. |
| 4,142,797 A | 3/1979 | Astheimer |
| 4,169,676 A | 10/1979 | Kaiser |
| 4,170,987 A | 10/1979 | Anselmo et al. |
| 4,260,220 A | 4/1981 | Whitehead |
| 4,322,163 A | 3/1982 | Schiller |
| 4,427,889 A | 1/1984 | Muller |
| 4,537,484 A | 8/1985 | Fowler |
| 4,598,715 A | 7/1986 | Machler et al. |

(Continued)

FOREIGN PATENT DOCUMENTS

DE 10153808 5/2003

(Continued)

OTHER PUBLICATIONS

Anderson, C. E. et al., "Fundamentals of Calibration Transfer Through Procrustes Analysis," Appln. Spectros., vol. 53, No. 10 (1999) p. 1268-1276.

(Continued)

*Primary Examiner*—John B Strege
(74) *Attorney, Agent, or Firm*—Townsend and Townsend and Crew LLP (57) ABSTRACT

A biometric measurement system has a platen, an illumination source, a light detector, and a controller. The controller is interfaced with the illumination source and the light detector. The controller has instructions to illuminate a purported skin site of an individual under distinct optical conditions during a single illumination session while the purported skin site is moved over the platen. The controller also has instructions to derive a multispectral image of the purported skin site from light received by the light detector after scattering from the purported skin site for multiple distinct optical conditions while the purported skin site is moved over the platen.

28 Claims, 5 Drawing Sheets

U.S. PATENT DOCUMENTS

| | | | |
|---|---|---|---|
| 4,653,880 A | 3/1987 | Sting et al. | |
| 4,654,530 A | 3/1987 | Dybwad | |
| 4,655,225 A | 4/1987 | Dahne et al. | |
| 4,656,562 A | 4/1987 | Sugino | |
| 4,657,397 A | 4/1987 | Oehler et al. | |
| 4,661,706 A | 4/1987 | Messerschmidt et al. | |
| 4,684,255 A | 8/1987 | Ford | |
| 4,699,149 A | 10/1987 | Rice | |
| 4,712,912 A | 12/1987 | Messerschmidt | |
| 4,730,882 A | 3/1988 | Messerschmidt | |
| 4,747,147 A | 5/1988 | Sparrow | |
| 4,787,013 A | 11/1988 | Sugino et al. | |
| 4,787,708 A | 11/1988 | Whitehead | |
| 4,830,496 A | 5/1989 | Young | |
| 4,853,542 A | 8/1989 | Milosevic et al. | |
| 4,857,735 A | 8/1989 | Noller | |
| 4,859,064 A | 8/1989 | Messerschmidt et al. | |
| 4,866,644 A | 9/1989 | Shenk et al. | |
| 4,867,557 A | 9/1989 | Takatani et al. | |
| 4,882,492 A | 11/1989 | Schlager | |
| 4,883,953 A | 11/1989 | Koashi et al. | |
| 4,936,680 A | 6/1990 | Henkes et al. | |
| 4,944,021 A | 7/1990 | Hoshino et al. | |
| 4,975,581 A | 12/1990 | Robinson et al. | |
| 5,015,100 A | 5/1991 | Doyle | |
| 5,019,715 A | 5/1991 | Sting et al. | |
| 5,028,787 A | 7/1991 | Rosenthal et al. | |
| 5,051,602 A | 9/1991 | Sting et al. | |
| 5,055,658 A | 10/1991 | Cockburn | |
| 5,068,536 A | 11/1991 | Rosenthal | |
| 5,070,874 A | 12/1991 | Barnes et al. | |
| 5,077,803 A | 12/1991 | Kato et al. | |
| 5,109,428 A | 4/1992 | Igaki et al. | |
| 5,146,102 A | 9/1992 | Higuchi et al. | |
| 5,158,082 A | 10/1992 | Jones | |
| 5,163,094 A | 11/1992 | Prokoski et al. | |
| 5,177,802 A | 1/1993 | Fujimoto et al. | |
| 5,178,142 A | 1/1993 | Harjunmaa et al. | |
| 5,179,951 A | 1/1993 | Knudson | |
| 5,204,532 A | 4/1993 | Rosenthal | |
| 5,222,495 A | 6/1993 | Clarke et al. | |
| 5,222,496 A | 6/1993 | Clarke et al. | |
| 5,223,715 A | 6/1993 | Taylor | |
| 5,225,678 A | 7/1993 | Messerschmidt | |
| 5,230,702 A | 7/1993 | Lindsay et al. | |
| 5,237,178 A | 8/1993 | Rosenthal et al. | |
| 5,243,546 A | 9/1993 | Maggard | |
| 5,257,086 A | 10/1993 | Fateley et al. | |
| 5,258,922 A | 11/1993 | Grill | |
| 5,267,152 A | 11/1993 | Yang et al. | |
| 5,268,749 A | 12/1993 | Weber et al. | |
| 5,291,560 A | 3/1994 | Daugman | |
| 5,299,570 A | 4/1994 | Hatschek | |
| 5,303,026 A | 4/1994 | Strobl et al. | |
| 5,311,021 A | 5/1994 | Messerschmidt | |
| 5,313,941 A | 5/1994 | Braig et al. | |
| 5,321,265 A | 6/1994 | Block | |
| 5,331,958 A | 7/1994 | Oppenheimer | |
| 5,348,003 A | 9/1994 | Caro | |
| 5,351,686 A | 10/1994 | Steuer et al. | |
| 5,355,880 A | 10/1994 | Thomas et al. | |
| 5,360,004 A | 11/1994 | Purdy et al. | |
| 5,361,758 A | 11/1994 | Hall et al. | |
| 5,366,903 A | 11/1994 | Lundsgaard et al. | |
| 5,372,135 A | 12/1994 | Mendelson et al. | |
| 5,379,764 A | 1/1995 | Barnes et al. | |
| 5,402,778 A | 4/1995 | Chance | |
| 5,405,315 A | 4/1995 | Khuri et al. | |
| 5,413,098 A | 5/1995 | Benaron et al. | |
| 5,419,321 A | 5/1995 | Evans | |
| 5,435,309 A | 7/1995 | Thomas et al. | |
| 5,441,053 A | 8/1995 | Lodder et al. | |
| 5,452,723 A | 9/1995 | Wu et al. | |
| 5,459,317 A | 10/1995 | Small et al. | |
| 5,459,677 A | 10/1995 | Kowalski et al. | |
| 5,460,177 A | 10/1995 | Purdy et al. | |
| 5,483,335 A | 1/1996 | Tobias | |
| 5,494,032 A | 2/1996 | Robinson et al. | |
| 5,505,726 A | 4/1996 | Meserol | |
| 5,507,723 A | 4/1996 | Keshaviah | |
| 5,515,847 A | 5/1996 | Braig et al. | |
| 5,518,623 A | 5/1996 | Keshaviah et al. | |
| 5,523,054 A | 6/1996 | Switalski et al. | |
| 5,533,509 A | 7/1996 | Koashi et al. | |
| 5,537,208 A | 7/1996 | Bertram et al. | |
| 5,539,207 A | 7/1996 | Wong et al. | |
| 5,552,997 A | 9/1996 | Massart | |
| 5,559,504 A | 9/1996 | Itsumi et al. | |
| 5,568,251 A | 10/1996 | Davies et al. | |
| 5,596,992 A | 1/1997 | Haaland et al. | |
| 5,606,164 A | 2/1997 | Price et al. | |
| 5,613,014 A | 3/1997 | Eshera et al. | |
| 5,630,413 A | 5/1997 | Thomas et al. | |
| 5,636,633 A | 6/1997 | Messerschmidt et al. | |
| 5,655,530 A | 8/1997 | Messerschmidt | |
| 5,672,864 A | 9/1997 | Kaplan | |
| 5,672,875 A | 9/1997 | Block et al. | |
| 5,677,762 A | 10/1997 | Ortyn et al. | |
| 5,681,273 A | 10/1997 | Brown | |
| 5,708,593 A | 1/1998 | Saby et al. | |
| 5,719,399 A | 2/1998 | Alfano et al. | |
| 5,719,950 A | 2/1998 | Osten et al. | |
| 5,724,268 A | 3/1998 | Sodickson et al. | |
| 5,729,619 A | 3/1998 | Puma | |
| 5,737,439 A | 4/1998 | Lapsley et al. | |
| 5,743,262 A | 4/1998 | Lepper, Jr. et al. | |
| 5,747,806 A | 5/1998 | Khalil | |
| 5,750,994 A | 5/1998 | Schlager | |
| 5,751,835 A | 5/1998 | Topping et al. | |
| 5,761,330 A | 6/1998 | Stoianov et al. | |
| 5,782,755 A | 7/1998 | Chance et al. | |
| 5,792,050 A | 8/1998 | Alam et al. | |
| 5,792,053 A | 8/1998 | Skladner et al. | |
| 5,793,881 A | 8/1998 | Stiver et al. | |
| 5,796,858 A | 8/1998 | Zhou et al. | |
| 5,808,739 A | 9/1998 | Turner et al. | |
| 5,818,048 A | 10/1998 | Sodickson et al. | |
| 5,823,951 A | 10/1998 | Messerschmidt et al. | |
| 5,828,066 A | 10/1998 | Messerschmidt | |
| 5,830,132 A | 11/1998 | Robinson | |
| 5,830,133 A | 11/1998 | Osten et al. | |
| 5,850,623 A | 12/1998 | Carman, Jr. et al. | |
| 5,853,370 A | 12/1998 | Chance et al. | |
| 5,857,462 A | 1/1999 | Thomas et al. | |
| 5,860,421 A | 1/1999 | Eppstein et al. | |
| 5,867,265 A | 2/1999 | Thomas | |
| 5,886,347 A | 3/1999 | Inoue et al. | |
| 5,902,033 A | 5/1999 | Levis et al. | |
| 5,914,780 A | 6/1999 | Turner et al. | |
| 5,929,443 A | 7/1999 | Alfano et al. | |
| 5,933,792 A | 8/1999 | Anderson et al. | |
| 5,935,062 A | 8/1999 | Messerschmidt et al. | |
| 5,945,676 A | 8/1999 | Khalil | |
| 5,949,543 A | 9/1999 | Bleier et al. | |
| 5,957,841 A | 9/1999 | Maruo et al. | |
| 5,961,449 A | 10/1999 | Toida et al. | |
| 5,963,319 A | 10/1999 | Jarvis et al. | |
| 5,987,346 A | 11/1999 | Benaron et al. | |
| 5,999,637 A | 12/1999 | Toyoda et al. | |
| 6,005,722 A | 12/1999 | Butterworth et al. | |
| 6,016,435 A | 1/2000 | Maruo et al. | |
| 6,025,597 A | 2/2000 | Sterling et al. | |
| 6,026,314 A | 2/2000 | Amerov et al. | |
| 6,028,773 A | 2/2000 | Hundt | |

| | | |
|---|---|---|
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,081,612 A | 6/2000 | Gutkowicz-Krusin et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,208,749 B1 | 3/2001 | Gutkowicz-Krusin |
| 6,212,424 B1 | 4/2001 | Robinson |
| 6,226,541 B1 | 5/2001 | Eppstein et al. |
| 6,229,908 B1 | 5/2001 | Edmonds et al. |
| 6,230,034 B1 | 5/2001 | Messerschmidt et al. |
| 6,236,047 B1 | 5/2001 | Malin et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 | 9/2001 | Brownlee |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing et al. |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,799,275 B1 | 9/2004 | Bjorn |
| 6,799,726 B2 | 10/2004 | Stockhammer |
| 6,816,605 B2 | 11/2004 | Rowe et al. |
| 6,825,930 B2 | 11/2004 | Cronin et al. |
| 6,928,181 B2 | 8/2005 | Brooks |
| 6,937,885 B1 | 8/2005 | Lewis et al. |
| 6,958,194 B1 | 10/2005 | Hopper et al. |
| 6,995,384 B2 | 2/2006 | Lee et al. |
| 7,147,153 B2 | 12/2006 | Rowe et al. |
| 7,347,365 B2 | 3/2008 | Rowe |
| 2002/0009213 A1 | 1/2002 | Rowe et al. |
| 2002/0101566 A1 | 8/2002 | Elsner et al. |
| 2002/0171834 A1 | 11/2002 | Rowe et al. |
| 2002/0183624 A1 | 12/2002 | Rowe et al. |
| 2003/0044051 A1 | 3/2003 | Fujieda |
| 2003/0078504 A1 | 4/2003 | Rowe |
| 2003/0223621 A1 | 12/2003 | Rowe et al. |
| 2004/0008875 A1 | 1/2004 | Linares |
| 2004/0047493 A1 | 3/2004 | Rowe et al. |
| 2004/0114783 A1 | 6/2004 | Spycher et al. |
| 2004/0179722 A1 | 9/2004 | Moritoki et al. |
| 2004/0240712 A1 | 12/2004 | Rowe et al. |
| 2005/0007582 A1 | 1/2005 | Villers et al. |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1 | 12/2005 | Rowe et al. |
| 2005/0271258 A1 | 12/2005 | Rowe |
| 2006/0002597 A1 | 1/2006 | Rowe |
| 2006/0002598 A1 | 1/2006 | Rowe et al. |
| 2006/0115128 A1 | 6/2006 | Mainguet |
| 2006/0202028 A1 | 9/2006 | Rowe |
| 2006/0210120 A1 | 9/2006 | Rowe |
| 2006/0274921 A1 | 12/2006 | Rowe |

FOREIGN PATENT DOCUMENTS

| | | |
|---|---|---|
| EP | 0 280 418 A1 | 8/1988 |
| EP | 0 372 748 | 6/1990 |
| EP | 0 897 164 A2 | 2/1999 |
| EP | 0 924 656 A2 | 6/1999 |
| EP | 1 353 292 | 10/2003 |
| EP | 1 434 162 A2 | 6/2004 |
| FR | 2761180 A1 | 9/1998 |
| JP | 2001-184490 A | 7/2001 |
| JP | 2002-133402 A | 5/2002 |
| JP | 2003-308520 A | 10/2003 |
| WO | WO 92/00513 A1 | 1/1992 |
| WO | WO 92/17765 A1 | 10/1992 |
| WO | WO 93/07801 A1 | 4/1993 |
| WO | WO 01/18332 A1 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 01/65471 A | 9/2001 |
| WO | WO 02/084605 A2 | 10/2002 |
| WO | WO 02/099393 A2 | 12/2002 |
| WO | WO 03/096272 A1 | 11/2003 |
| WO | WO 2004/068388 A2 | 8/2004 |
| WO | WO 2004/068394 A1 | 8/2004 |
| WO | WO 2004/090786 | 10/2004 |
| WO | WO 2006/049394 A | 5/2006 |

OTHER PUBLICATIONS

Ashboum, Julian, Biometrics; Advanced Identity Verification, Springer, 2000, pp. 63-64).

Blank, T.B. et al., "Transfer of Near-Infrared Multivariate Calibrations Without Standards," Anal. Chem., vol. 68 (1996) p. 2987.

Brasunas John C. et al., "Uniform Time-Sampling Fourier Transform Spectroscopy," Applied Optics, vol. 36, No. 10, Apr. 1, 1997, pp. 2206-2210.

Brault, James W., "New Approach to High-Precision Fourier Transform Spectrometer Design," Applied Optics, Vo. 35, No. 16, Jun. 1, 1996, pp. 2891-2896.

Brochure entitled "Improve the Clinical Outcome of Every Patient", In Line Diagnostics, published on or before Oct. 30, 1997, 2 pages.

Cassarly, W.J. et al., "Distributed Lighting Systems: Uniform Light Delivery," Source Unknown, pp. 1698-1702, 1995.

Chang, Chong-Min et al., "An Uniform Rectangular Illuminating Optical System for Liquid Crystal Light Valve Projectors," Euro Display '96 (1996) pp. 257-260.

Coyne, Lawrence J. et al., "Distributive Fiber Optic couplers Using Rectangular Lightguides as Mixing Elements," (Information Gatekeepers, Inc. Brookline, MA, 1979) pp. 160-164.

de Noord, Onno E., "Multivariate Calibration Standardization," Chemometrics and intelligent Laboratory Systems 25, (1994) pp. 85-97.

Despain, Alvin M. et al., "A Large-Aperture Field-Widened Interferometer-Spectrometer for Airglow Studies," Aspen International Conference on Fourier Spectroscopy, 1970, pp. 293-300.

Faber, Nicolaas, "Multivariate Sensitivity for the Interpretation of the Effect of Spectral Pretreatment Methods on Near-Infrared Calibration Model Predictions," Analytical Chemistry, vol. 71, No. 3, Feb. 1, 1999, pp. 557-565.

Geladi, Paul et al., A Multivariate NIR Study of Skin Alterations in Diabetic Patients as Compared to Control Subj ects, J. Near Infrared Spectrosc., vol. 8 (2000) pp. 217-227.

Lee et al., "Fingerprint Recognition Using Principal Gabor Basis Function", Proceedings of 2001 International Symposium on Intelligent Multimedia, Video and Speech Processing, May 2-4, 2001, Sections 2-3.

Nixon, Kristin A. et al., "Novel Spectroscopy-Based Technology for Biometric and Liveness Verification", Technology for Human Identification. Proceedings od SPIE, vol. 5404, No. 1, XP-002458441, Apr. 12-13, 2004, pp. 287-295 (ISSN: 0277-786x).

Pan et al., "Face Recognition in Hyperspectral Images", IEEE Transactions on Pattern Analysis and Machine Intelligence vol. 25, No. 12, Dec. 2003.

Ross et al., "A Hybrid Fingerprint Matcher," Pattern Recognition 36, The Journal of the Pattern Recognition Society, 2003 Elsevier Science Ltd., pp. 1661-1673.

Selvaraj et al., Fingerprint Verification Using Wavelet Transform, Proceedings of the Fifth International Conference on Computational Intelligence and Multimedia Applications, IEEE, 2003.

Bantle, John P. et al., "Glucose Measurement in Patients With Diabetes Mellitus With Dermal Interstitial Fluid," Mosby-Year Book, Inc., 9 pages, 1997.

Berkoben, Michael S. et al., "Vascular Access for Hemodialysis," Clinical Dialysis, Third Edition, pp. 2 cover pages and 26-45, 1995.

Bleyer, Anthony J. et al., "The Costs of Hospitalizations Due to Hemodialysis Access Management," Nephrology News & Issues, pp. 19, 20 and 22, Jan. 1995.

Daugirdas, JT et al., "Comparison of Methods to Predict the Equilibrated Kt/V (eKt/V) in the Hemo Study," National Institutes of Health, pp. 1-28, Aug. 20, 1996.

Demos, S. G. et al., "Optical Fingerprinting Using Polarisation Contrast Improvement," Electronics Letters, vol. 33, No. 7, pp. 582-584, Mar. 27, 1997.

Depner, Thomas A. et al., "Clinical Measurement of Blood Flow in Hemodialysis Access Fistulae and Grafts by Ultrasound Dilution," Division of Nephrology, University of California, pp. M745-M748, published on or before Oct. 30, 1997.

Fresenius USA, "Determination of Delivered Therapy Through Measurement of Effective Clearance," 2 pages, Dec. 1994.

Hakim, Raymond M. et al., "Effects of Dose of Dialysis on Morbidity and Mortality," American Journal of Kidney Diseases, vol. 23, No. 5, pp. 661-669, May 1994.

Jacobs, Paul et al., "A Disposable Urea Sensor for Continuous Monitoring of Hemodialysis Efficiency," ASAIO Journal, pp. M353-M358, 1993.

Keshaviah, Prakash R. et al., "On-Line Monitoring of the Delivery of the Hemodialysis Prescription," Pediatric Nephrology, vol. 9, pp. S2-S8, 1995.

Krivitski, Nikolai M., "Theory and Validation of Access Flow Measurement by Dilution Technique During Hemodialysis," Kidney International, vol. 48, pp. 244-250, 1995.

Marbach, Ralf, "Measurement Techniques for IR Spectroscopic Blood Glucose Determination," Fortschritt Bericht, Series 8: Measurement and Control Technology, No. 346, pp. cover and 1-158, Mar. 28, 1994.

Mardia, K.V. et al., "Chapter 11—Discriminant Analysis," Multivariate Analysis, pp. 2 cover pages and 300-325, 1979.

Nichols, Michael G. et al., "Design and Testing of a White-Light, Steady-State Diffuse Reflectance Spectrometer for Determination of Optical Properties of Highly Scattering Systems," Applied Optics, vol. 36, No. 1, pp. 93-104, Jan. 1, 1997.

Ripley, B. D., "Chapter 3—Linear Discriminant Analysis," Pattern Recognition and Neural Networks, pp. 3 cover pages and 91-120, 1996.

Ronco, C. et al., "On-Line Urea Monitoring : A Further Step Towards Adequate Dialysis Prescription and Delivery," The International Journal of Artificial Organs, vol. 18, No. 9, pp. 534-543, 1995.

Service, F. John et al., "Dermal Interstitial Glucose as an Indicator of Ambient Glycemia," Diabetes Care, vol. 20, No. 9, 8 pages, Aug. 1997.

Sherman, Richard A., "Chapter 4—Recirculation in the Hemodialysis Access," Principles and Practice of Dialysis, pp. 2 cover pages and 38-46, 1994.

Sherman, Richard A., "The Measurement of Dialysis Access Recirculation," American Journal of Kidney Diseases, vol. 22, No. 4, pp. 616-621, Oct. 1993.

Steuer, Robert R. et al., "A New Optical Technique for Monitoring Hematocrit and Circulating Blood Volume: Its Application In Renal Dialysis," Dialysis & Transplantation, vol. 22, No. 5, pp. 260-265, May 1993.

Webb, Paul, "Temperatures of Skin, Subcutaneous Tissue, Muscle and Core in Resting Men in Cold, Comfortable and Hot Conditions," European Journal of Applied Physiology, vol. 64, pp. 471-476, 1992.

Zavala, Albert et al., "Using Fingerprint Measures to Predict Other Anthropometric Variables," Human Factors, vol. 17, No. 6, pp. 591-602, 1975.

MULTISPECTRAL BIOMETRIC SENSORS

CROSS-REFERENCES TO RELATED APPLICATIONS

This application is a nonprovisional of, and claims the benefit of the filing date of, U.S. Pat. Appl. No. 60/675,776, entitled "MULTISPECTRAL BIOMETRIC SENSORS," filed Apr. 27, 2005 by Robert K. Rowe, the entire disclosure of which is incorporated herein by reference for all purposes.

This application is also related to the following applications, each of which is incorporated herein by reference in its entirety for all purposes: U.S. patent application Ser. No. 11/115,100, entitled "MULTISPECTRAL IMAGING BIOMETRICS," filed Apr. 25, 2005 by Robert K. Rowe; U.S. patent application Ser. No. 11/115,101, entitled "MULTISPECTRAL BIOMETRIC IMAGING," filed Apr. 25, 2005 by Robert K. Rowe et al.; and U.S. patent application Ser. No. 11/115,075, entitled "MULTISPECTRAL LIVENESS DETERMINATION," filed Apr. 25, 2005 by Robert K. Rowe. Each of these three applications is a nonprovisional of each of the following provisional applications, the entire disclosures of which are also incorporated herein by reference for all purposes: U.S. Prov. Pat. Appl. No. 60/576,364, entitled "MULTISPECTRAL FINGER RECOGNITION," filed Jun. 1, 2004 by Robert K. Rowe and Stephen P. Corcoran; U.S. Prov. Pat. Appl. No. 60/600,867, entitled "MULTISPECTRAL IMAGING BIOMETRIC," filed Aug. 11, 2004 by Robert K. Rowe; U.S. Prov. Pat. Appl. No. 60/610,802, entitled "FINGERPRINT SPOOF DETECTION USING MULTISPECTRAL IMAGING," filed Sep. 17, 2004 by Robert K. Rowe; U.S. Prov. Pat. Appl. No. 60/654,354, entitled "SYSTEMS AND METHODS FOR MULTISPECTRAL FINGERPRINT SENSING," filed Feb. 18, 2005 by Robert K. Rowe; and U.S. Prov. Pat. Appl. No. 60/659,024, entitled "MULTISPECTRAL IMAGING OF THE FINGER FOR BIOMETRICS," filed Mar. 4, 2005 by Robert K. Rowe et al This application is further related to commonly assigned U.S. patent application Ser. No. 11/009,372, entitled "METHODS AND SYSTEMS FOR ESTIMATION OF PERSONAL CHARACTERISTICS FROM BIOMETRIC MEASUREMENTS," filed Dec. 9, 2004 by Robert K. Rowe, the entire disclosure of which is incorporated herein by reference for all purposes.

The applications identified above are sometimes referred to herein collectively as "the related applications."

BACKGROUND OF THE INVENTION

This application relates to biometric sensors. More specifically, this application relates to biometric sensors that may be incorporated into portable electronic devices.

Typical fingerprint sensors use hardware and software that perform a single function or a limited range of functions (e.g. collect biometric data and also act as a pointing device on a cellular phone). In applications that require a biometric sensor as part of a portable electronic device (PED), such as a cellular telephone, PDA or laptop computer, the addition of a fingerprint reader may significantly increase the cost and complexity of the overall system. In many cases, semiconductor-based fingerprint sensors are selected for PED applications since they can be made small and with a relatively low cost. However, semiconductor readers are relatively fragile, requiring protection from electrostatic discharge, scratching and abrasion, water, and other such effects. Typically optical fingerprint technologies may be made more robust to these effects, but are often too large and too complex to be considered for incorporation into PED's or other applications requiring small and simple sensors.

There is accordingly a general need in the art for improved methods and systems that incorporate biometric sensors into PEDs.

BRIEF SUMMARY OF THE INVENTION

Embodiments of the invention provide a biometric measurement system. The biometric measurement system comprises a platen, an illumination source, a light detector, and a controller. The controller is interfaced with the illumination source and the light detector. The controller has instructions to illuminate a purported skin site of an individual under a plurality of distinct optical conditions during a single illumination session while the purported skin site is moved over the platen. The controller also has instructions to derive a multispectral image of the purported skin site from light received by the light detector after scattering from the purported skin site for each of multiple of the plurality of distinct optical conditions while the purported skin site is moved over the platen.

In different embodiments, the skin site may be in contact with the platen or may not be in contact with the platen.

In some embodiments, the instructions to derive the multispectral image may comprise instructions to generate a composite of a plurality of images derived for different portions of the purported skin site as the purported skin site is moved over the platen. For example, the platen may comprise a roller with which a position of the skin site relative to the light detector is moved.

The illumination source may comprise a first illumination source disposed to illuminate the platen under total internal reflectance conditions. Corresponding instructions to illuminate the purported skin site may thus comprise instructions to illuminate the platen with the first source such that the skin site is illuminated indirectly. The illumination source may sometimes further comprise a second source disposed to illuminate the skin site directly. Corresponding instructions to illuminate the skin site may thus further comprise instructions to illuminate the skin site directly with the second source.

In some embodiments, the imager may comprise a color imager, providing for multiple subimages, with each subimage corresponding to a different illumination wavelength or range of wavelengths. The wavelengths forming the multiple subimages may sometimes be derived from multiple monochromatic illumination sources or may sometimes be derived from one or more broadband illumination sources.

In some embodiments, the biometric measurement system may be integrated with a portable electronic device. In such instances, the controller may additionally include instructions to perform a nonbiometric function with an imaging system that comprises the light detector, such as might be performed with a comparable portable electronic device lacking the biometric measurement system. The illumination source may be a white-light source. In one embodiment, a lightpipe is adapted to guide light from the illumination source to the platen. In such an embodiment, the instructions to perform the nonbiometric function may comprise instructions to perform a nonbiometric function with both the illumination source and the imaging system.

BRIEF DESCRIPTION OF THE DRAWINGS

A further understanding of the nature and advantages of the present invention may be realized by reference to the remaining portions of the specification and the drawings wherein like reference labels are used through the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

DETAILED DESCRIPTION OF THE INVENTION

Many PED's today include a digital imaging capability. The uses of the digital camera range from taking pleasure photos for remembrances and/or sharing, to using a camera in a laptop for business video conferencing. The imagers used in PED's are typically color imagers having a silicon imaging array covered by a Red-Green-Blue color filter array arranged in a Bayer pattern. Camera resolution is usually 640×480 (VGA) or 1280×1024 (XGA), or better. Imaging is provided for by one or more lenses or other optical elements. In some cases, the optical system is of a variable focus design that enables a wide range of focal distances. In some cases, the optical systems are capable of performing macro photography.

Most PED's contain one or more light sources for various purposes. In many cases these light sources are light emitting diodes (LED's) in either monochromatic or broad band ("white-light") configurations. In some cases the light sources are used for purposes such as supplying lighting to keyboards, backlighting for screens, or supplying electronic flash for digital imaging.

Systems and methods of multispectral imaging (MSI) are disclosed by the inventors in the related applications as having favorable characteristics relative to other fingerprint imaging technologies. Multispectral imaging is characterized by the illumination of a site under a plurality of distinct optical conditions during a single illumination session. The illumination under distinct optical conditions is sometimes performed simultaneously and sometimes performed sequentially in different embodiments. Such use of multiple optical conditions provides additional information that can be used to improve the overall performance of the biometric sensor as well as to enhance the ability of the sensor to detect attempts to use an artificial or altered sample to defeat the system. In some cases, the multiple optical conditions provide additional information that can be used to estimate personal characteristics such as age, gender, and ethnicity. The multiple optical conditions may include multiple illumination wavelengths, multiple polarization conditions, and multiple illumination and/or imaging angles. In the latter case, angles that produce images substantially affected by total internal reflectance (TIR) effects provide different and complementary information from those angles that are substantially unaffected by TIR (i.e. "direct illumination").

As will be understood by those of skill in the art, TIR effects result from the presence or absence of a difference in the index of refraction between a sensor platen and the finger placed on it. When the angle of light at an interface is greater than the critical angle determined from Snell's law and an air-filled valley of the fingerprint is present at a particular location of the platen, TIR occurs in the platen because of the air-platen index difference. Alternatively, if skin of the proper index of refraction is in optical contact with the platen, the TIR at this location is "frustrated," allowing light to traverse the platen-skin interface. A map of the differences in TIR across the region where the finger is touching the platen forms the basis for a conventional optical fingerprint reading. A number of optical arrangements are used to detect this variation of the optical interface in both bright-field and dark-field optical arrangements.

For purposes of illustration, the following description sometimes makes reference to use of a "finger" in performing measurements. It will be appreciated, however, that such illustrations are not intended to be limiting. Alternative sites that may be used include all surfaces and all joints of the fingers and thumbs, the fingernails and nail beds, the palms, the backs of the hands, the wrists and forearms, the face, the eyes, the ears, and all other external surfaces of the body.

In some embodiments, a sensor provides a plurality of discrete wavelengths of light that penetrate the surface of the skin, and scatter within the skin and/or underlying tissue. As used herein, reference to "discrete wavelengths" is intended to refer to sets of wavelengths or wavelength bands that are treated as single binned units—for each binned unit, information is extracted only from the binned unit as a whole, and not from individual wavelength subsets of the binned unit. In some cases, the binned units may be discontinuous so that when a plurality of discrete wavelengths are provided, some wavelength between any pair of the wavelengths or wavelength bands is not provided, but this is not required. In some cases, the binned units may overlap so that when a discrete wavelength is provided, two or more units may respond in some relative proportion. In some instances, the wavelengths are within the ultraviolet—visible—near-infrared wavelength range.

A portion of the light scattered by the skin and/or underlying tissue exits the skin and is used to form an image of the structure of the tissue at or below the surface of the skin. In some embodiments, such an image may include a fingerprint image, where the term "fingerprint" is used broadly herein to refer to any representation of any skin site with dermatoglyphic features and/or other textural features.

Embodiments of the invention thus provide improved systems and methods for collecting a set of MSI data with a single imager and a small number of other components similar to those already incorporated into many PEDs. Furthermore, certain embodiments advantageously adapt the design of existing imaging systems in PEDs in such a way that the biometric functionality may be achieved while retaining the general imaging functionality.

Figure 1A:
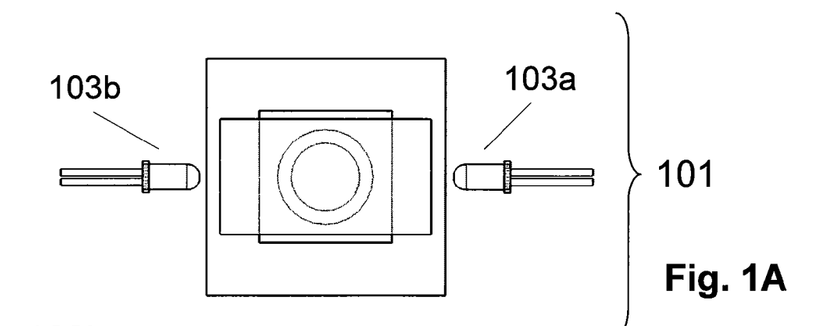
FIGS. 1A, 1B, and 1C provide top, side and isometric views of an area sensor according to one embodiment of the invention.
Figure 1B:
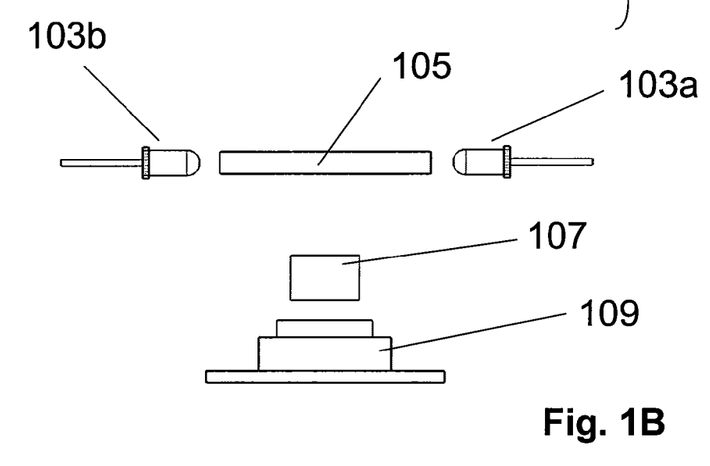
Figure 1C:
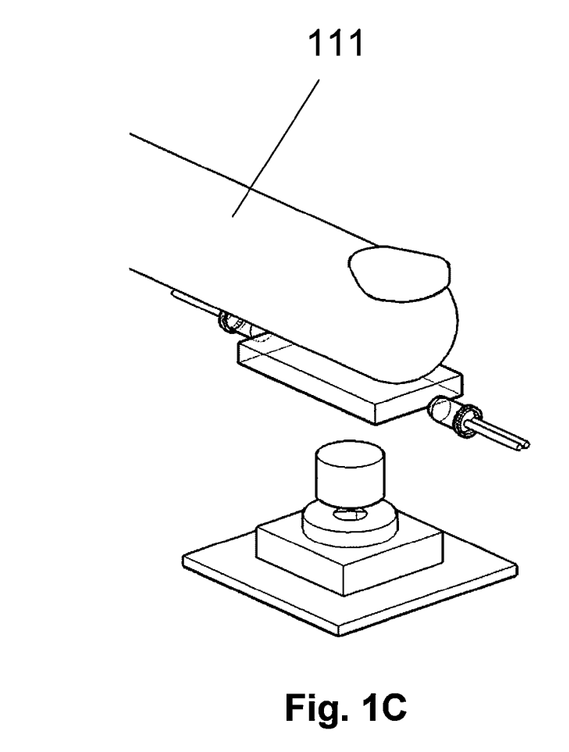

FIGS. 1A, 1B, and 1C illustrate one embodiment of the present invention. The sensor 101 is configured to collect biometric data by touching the finger 111 on the platen 105. Light sources 103 illuminate the platen 105 from one or more sides, providing TIR illumination. When no finger is touching the platen 105, a substantial portion of the light emitted from sources 103 will enter into the platen 105 and be transmitted through it via a series of TIR reflections. However, when the skin of the finger 111 (or other substance of appropriate refractive index) makes contact with the platen, the light in the platen may pass into the finger 111. A portion of this light is then scattered by the skin and directed through the platen 105 and toward the optical system 107, which images the finger 111 onto an imager 109. The light sources 103 may be monochromatic sources such as LED's, laser diodes, or quantum dot lasers, or they may be broadband sources such as white-light LED's and various incandescent sources such as quartz-tungsten-halogen and others as known in the art. Sources 103a, 103b may be of the same wavelength characteristics or different (e.g. substantially different wavelengths), and there may be more than the two sources depicted. There may be lenses, mirrors, or other optical elements (not shown) that direct light from the sources 103 into the platen 105.

The imaging system 107 may comprise one or more lenses, one or more mirrors, and/or other optical elements known in the art. The imager 109 may be an imaging array such as a silicon CCD or CMOS array. The imager may be a monochromatic imager or may be a color imager. Examples of implementations of color imager that may be used include a Bayer color filter array and a wavelength-splitting beam splitter combined with multiple monochromatic imagers, as known in the art. Another example of an implementation of a color imager that may be used is a junction-depth filtering apparatus such as produced by Foveon®, Inc. and described in U.S. Pat. No. 6,958,194, entitled "IMAGER WITH IMPROVED SENSITIVITY," by Peter J. Hopper et al., the entire disclosure of which is incorporated herein by reference for all purposes. In addition, the sensor 101 may comprise short-pass optical filters, band-pass optical filters, long-pass optical filters, linear polarizers, elliptical polarizers, diffuse scattering media, and/or other optical elements (not shown).

In one embodiment of the present invention, sensor 101 comprises a color RGB imager 109 and a variable-focus optical system 107 or other mechanism to obtain a focused image of the finger 111. The light sources 103 may be white-light LED's or some configuration of monochromatic LED's with one or more wavelengths that lie substantially within the Red-Green-Blue passbands of the imager 109. The optical system 107 may comprise a mechanical focus system, a liquid lens, a MEMS optical element, a system that implements wavefront coding technology, and/or other types of optical systems known in the art. The variable focus of the optical system 107 may allow the imager to image various depths in the finger. Additionally, the variable focus may enable the imager to be used for conventional imaging at times that a finger 111 is not present on the platen 105. The optical system 107 may provide a mechanism to perform macro imaging as required for barcode reading, optical scanning, and other such functions. As well, the optical system 107 may provide a mechanism to photograph distant objects such as people, landscapes and other such objects. In some cases, the optical system 107 may image directly through the platen 105. In other cases, the platen 105 may be movable or detachable, enabling the imager 109 to be used for conventional imaging when the platen 105 is not in the optical path and used for biometric tasks when the platen 105 is present. In some cases, the platen 105 may include one or more curved surfaces such that they provide optical power to improve the ability of the optical system 107 to focus on the finger 111.

Figure 2A:
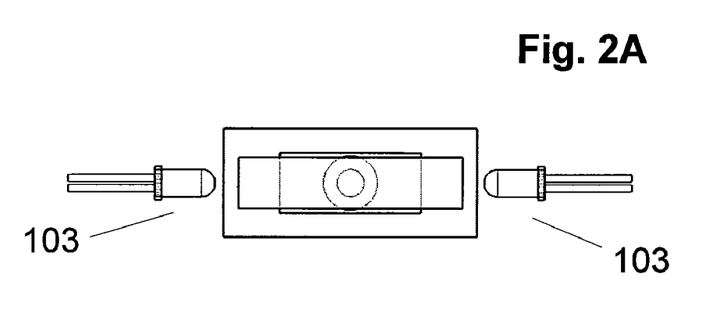
FIGS. 2A, 2B, and 2C provide top, side, and isometric views of a static swipe sensor according to another embodiment of the invention.
Figure 2B:
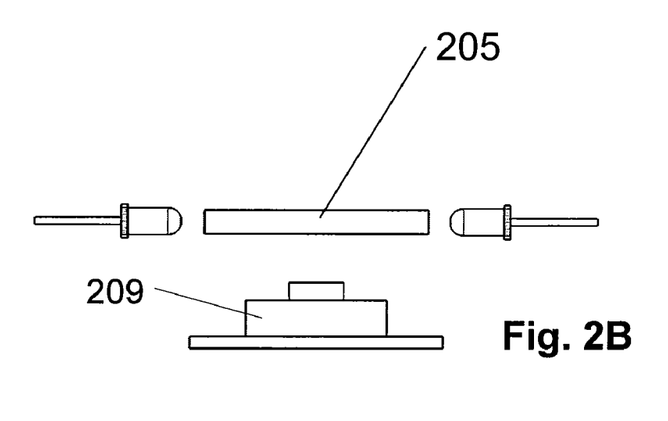
Figure 2C:
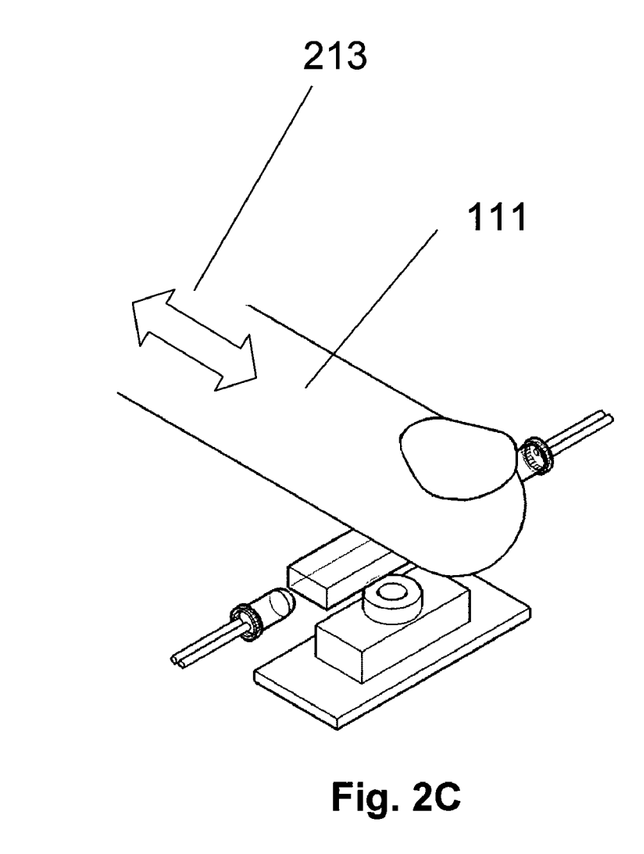

FIGS. 2A, 2B, and 2C illustrate a second embodiment of the present invention. In this embodiment, the platen 205 is of a narrow rectangular format and light sources 103 provide for TIR illumination. Similarly (although not necessarily) the imager 209 may also be a linear array or a rectangular array consisting of a small number of rows of pixels. In some cases, the optical system may be integrated with the imager 209 as depicted in FIGS. 2A-2C, instead of being a separate part as depicted in FIGS. 1A-1C. In this configuration, the finger 111 may be "swiped" or rubbed over the top of the sensor in either direction indicated by arrow 213. Multiple images or frames may be collected during the swipe and the image of the full finger region may then be reconstructed or "stitched" from the individual frames in a manner known in the art. In cases where the illumination source 103 comprises a broadband source and the imager 209 comprises a color imager, images corresponding to multiple illumination wavelengths may be collected simultaneously in this manner. Such a plurality of images may be used advantageously for biometric tasks such as identity determination, liveness determination and spoof detection, estimation of personal characteristics, and the like.

Figure 3:
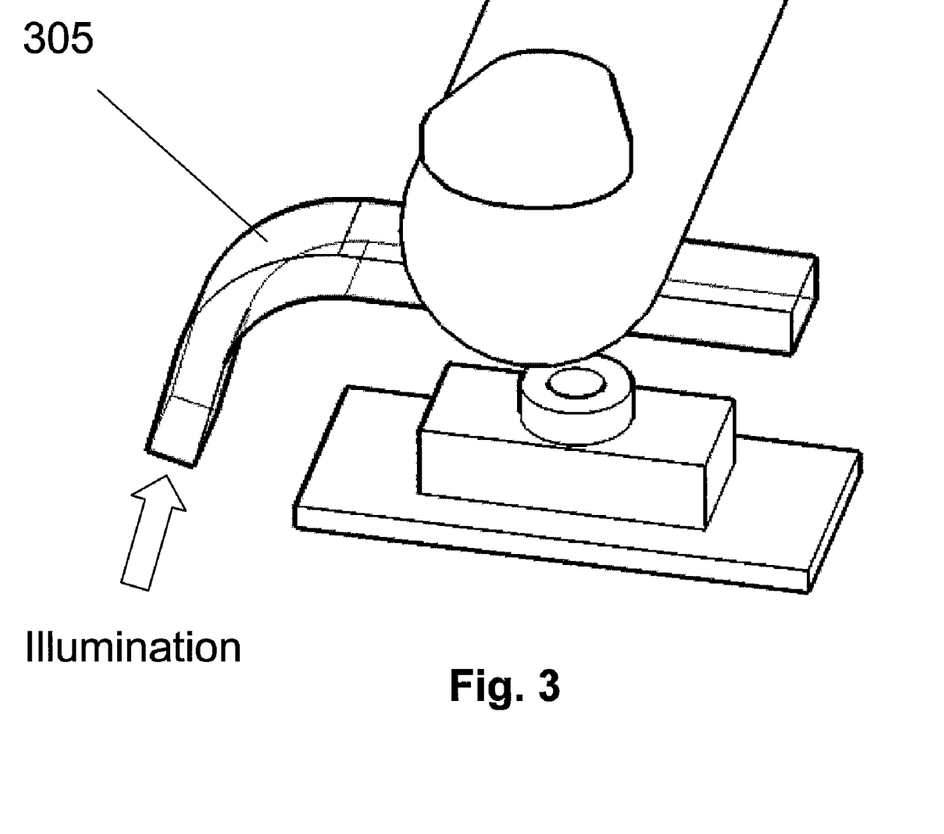
FIG. 3 provides an illustration of a static swipe sensor with a lightpipe according to an embodiment.

A variation of the illumination configuration is given by FIG. 3. In this figure, a lightpipe 305 is used to channel light from a distant light source (not shown). As depicted, the lightpipe 305 may be formed as the actual platen surface or the platen and light pipe might comprise a plurality of different pieces. Further, multiple lightpipes may be used and a variety of shapes may be selected in order to be consistent with other design constraints. In some embodiments, the lightpipe 305 is designed to maintain TIR throughout its length so light is channeled from the source (not shown). In other cases the lightpipe may be coated with a metallic film or other reflective material in certain portions to aid light transmission. In some cases, the coating may be a material that selectively reflects certain wavelengths better than others, providing a mechanism for filtering the light as it propagates through the lightpipe. The use of a lightpipe for illumination is applicable to a wide range of embodiments of the present invention including swipe and single-touch configurations.

Figure 4A:
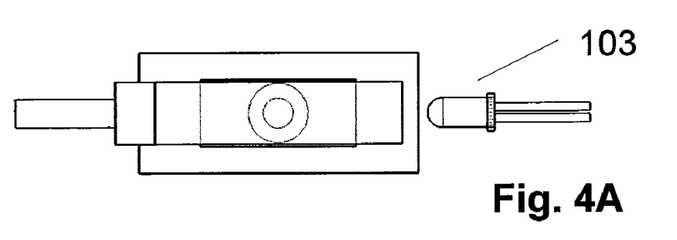
FIGS. 4A, 4B, and 4C provide top, side, and isometric views of a roller swipe sensor according to a further embodiment of the invention.
Figure 4B:
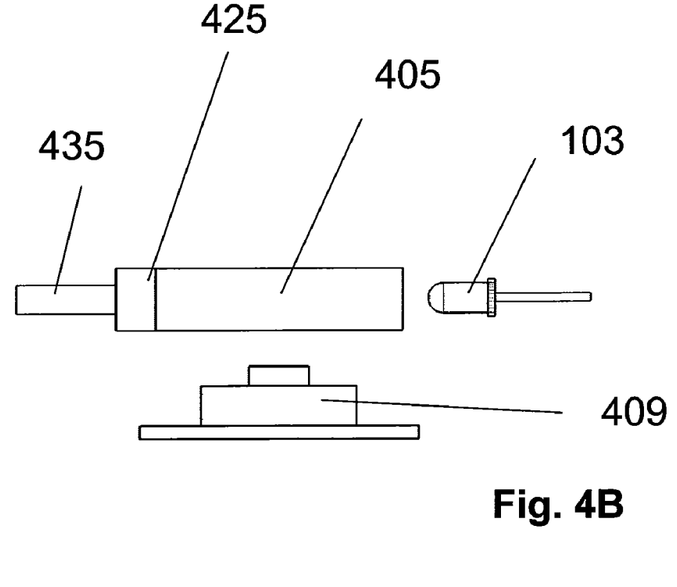
Figure 4C:
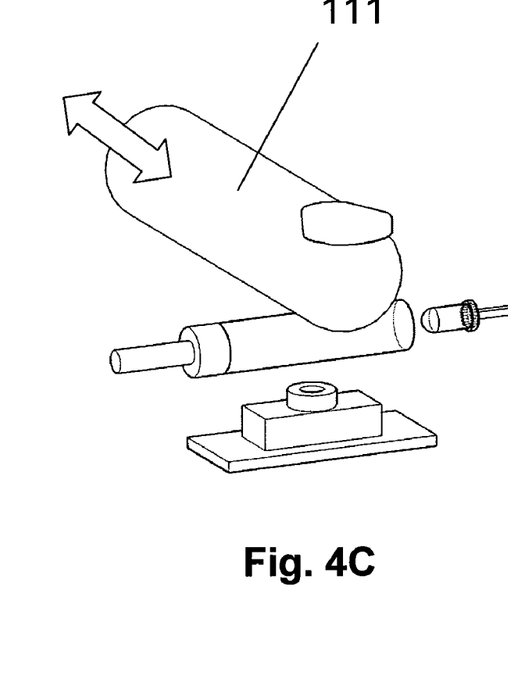

FIGS. 4A, 4B, and 4C illustrate a different embodiment of the present invention. In this configuration, the finger 111 is swiped over a rolling platen 405. The platen 405 is preferably an optically clear material such as plastic, glass or others of the sort through which light source 103 can provide TIR illumination. The rolling platen 405 is able to spin on axle 435 while the imager 409 views the finger 111 through an appropriate optical system (not shown). In a manner similar to FIGS. 2A-2C and FIG. 3, the imager 409 may collect multiple frames while the finger 111 is swiped and the resulting composite image may be reconstructed from these frames. Optionally, a position encoder 425, such as an optical encoder, may be attached to the rolling platen 405. In such a way, the position on the finger at which each frame is collected may be determined and used to better reconstruct the full image. As disclosed earlier, in cases where the imager 409 comprises a color imager and the illumination source 103 compresses a broadband source, multiple images of different wavelengths may be collected simultaneously and used for a variety of biometric tasks.

Figure 5:
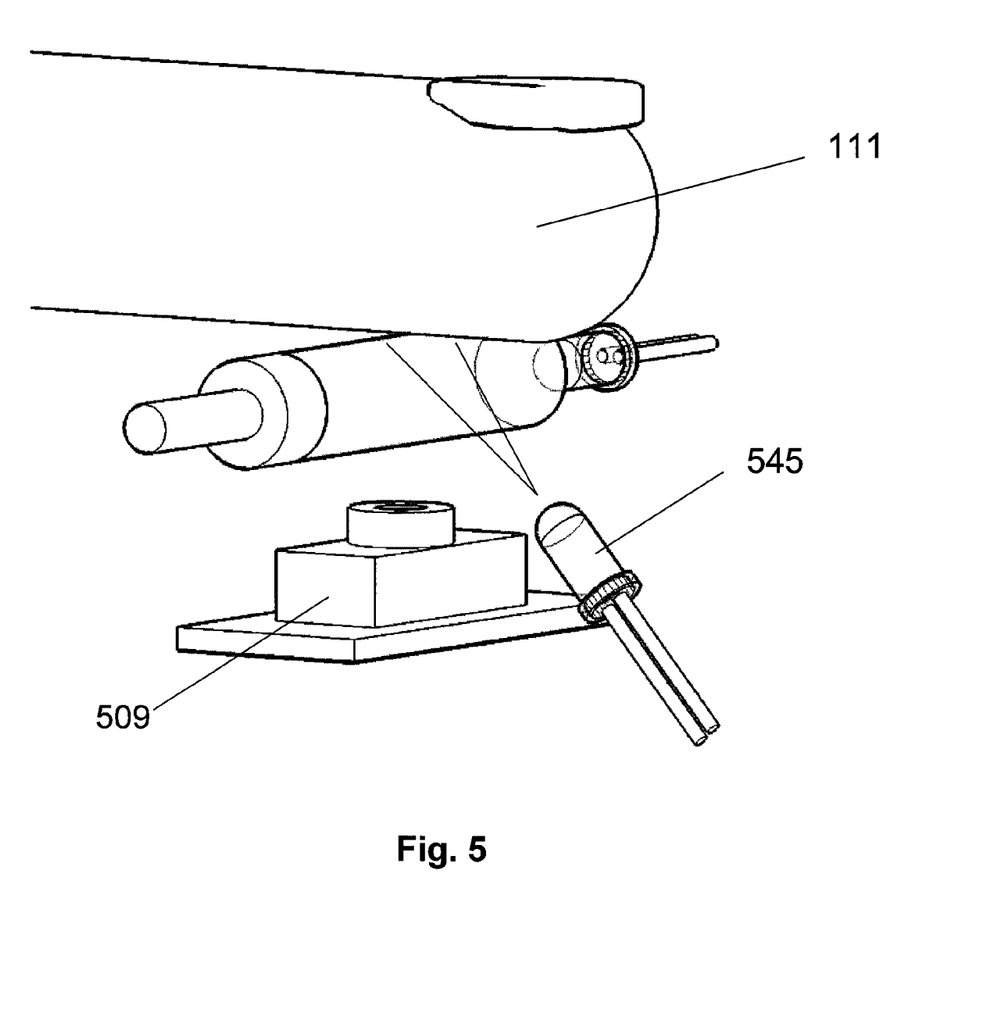
FIG. 5 provides an illustration of a roller swipe sensor that includes direct illumination in an embodiment.

FIG. 5 shows a variant of FIGS. 4A-4C that includes a light source 545 with a different orientation such that light is able to directly illuminate the finger 111. The light source 545 may optionally include an optical polarizing element (not shown) such as a linear polarizer. In such cases, the imager 509 may also include a polarizing element such as a linear polarizer (not shown), which may be oriented substantially perpendicular to the illumination polarizer. The direct illumination provided by light source 545 can be achieved using a variety of methods, but importantly such light is substantially unaffected by TIR effects that may occur between the finger 111 and the platen 505. Similar direct illumination techniques may also be used in conjunction with the other swipe and touch sensor embodiments of the present invention. In the case of a swipe embodiment, the direct and TIR illumination may be time modulated in a way that one frame is captured with TIR illumination and a second frame is captured under direct illumination. This alternation may then be continued throughout the duration of the finger swipe and two different images (i.e. direct-illuminated and TIR-illuminated) may be reconstructed. Similar time-modulated methods may also be applied to embodiments that incorporate multiple illumination sources (direct or TIR) with distinct wavelengths, distinct polarizations, or other differences in optical characteristics.

Alternatively, in cases where the imager 509 comprises a color filter array, the direct illumination source 545 and the TIR illumination source 503 may be different wavelengths. In particular, the TIR wavelength may be chosen such that it substantially passes through one of the color filter passbands (for example, red) while being substantially blocked by the other filter passbands (for example, blue and green). Similarly, the direct illumination may be a different wavelength (for example, blue) which is passed and blocked by the respective color filters. In such a way, both illumination sources 545 and 503 may be turned on simultaneously. The resulting image (in raw format rather than color processed) may thus be easily separated to produce the distinct image types. This same approach is applicable to any number of different imaging conditions, using sufficient numbers of different color filters with sufficient color discrimination characteristics and correspondingly monochromatic illumination sources.

In another alternative, the embodiment if FIG. 5 may be configured such that the TIR and direct images are additive rather than separable. For example, in the case of a monochromatic imager 509, both the direct illumination source 545 and the TIR illumination source 503 may be turned on at the same time, resulting in an image due to both sources. Similarly, in the case of a color imager 509, both sources 545 and 503 may have the same wavelength or may both be broadband sources, resulting in a similar additive image.

In some cases, the direct illumination may be used without TIR illumination. In such cases, noncontact measurements may be performed by holding the finger, hand, or other body part at an appropriate distance from the imager such that it can be illuminated and imaged. In the case of noncontact imaging, the platen may be eliminated from the system. In some cases, the direct illumination may be performed using a white-light LED such as is present on some PEDs to perform a flash function. The imager 509 may be a color imager, enabling the collection of multiple images corresponding to multiple wavelengths during a single illumination session.

In the case where the imager 509 comprises a color image, subsequent processing steps may be aided by separating the resulting color image into a series of subimages, each of which represents a substantially different illumination wavelength condition. For example, in the case that the color imager is of a Bayer configuration, four subimages may be extracted from raw RGB data corresponding to the red, blue, and two green channels. Each subimage is slightly offset from the others by an amount approximately equal to the pixel size, but all four subimages represent substantially the same object under the multiple illumination conditions. Such subimage generation is broadly applicable across all embodiments of the present invention that make use of a color imager.

In some case, embodiments of the invention may be combined with other types of fingerprint sensors. By way of illustration, the swipe configuration of the multispectral imager depicted in FIGS. 2A-2C may be located in close proximity to or integrated with a swipe sensor of a different modality, such as capacitive, RF, or thermal sensing technology. In this way, multiple modalities may be used to collect biometric data during each user action.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A portable electronic device comprising:
a body;
a platen adapted for placement of a purported skin site by an individual and integrated within the body;
an illumination source;
an imaging system; and
a controller interfaced with the illumination source and the imaging system, the controller including:
   instructions to illuminate the purported skin site under a plurality of distinct optical conditions during a single illumination session;
   instructions to derive a multispectral image of the purported skin site from light received by the imaging system after scattering from the purported skin site for each of multiple of the plurality of distinct optical conditions;
   instructions to perform a biometric function using the multispectral image; and
   instructions to perform a nonbiometric function with the imaging system.

2. The portable electronic device recited in claim 1 wherein the illumination source comprises a white-light source.

3. The portable electronic device recited in claim 1 wherein the instructions to derive the multispectral image of the purported skin site comprise instructions to derive a plurality of images of different portions of the skin site as the skin site is moved over the platen.

4. The portable electronic device recited in claim 3 wherein the instructions to derive the multispectral image further comprise instructions to generate a composite of the plurality of images of different portions of the skin site.

5. The portable electronic device recited in claim 3 wherein the platen comprises a roller with which a position of the skin site relative to the imaging system is moved.

6. The portable electronic device recited in claim 5 wherein the platen is optically clear.

7. The portable electronic device recited in claim 1 wherein the illumination source comprises a first source disposed to illuminate the platen under total internal reflectance conditions.

8. The portable electronic device recited in claim 7 wherein the instructions to illuminate the purported skin site comprise instructions to illuminate the platen with the first source such that the skin site is illuminated indirectly.

9. The portable electronic device recited in claim 8 wherein:
the illumination source further comprises a second source disposed to illuminate the skin site directly; and
the instructions to illuminate the purported skin site further comprise instructions to illuminate the skin site directly with the second source.

10. The portable electronic device recited in claim 7 further comprising a lightpipe adapted to guide light from the illumination source to the platen.

11. The portable electronic device recited in claim 1 wherein:
the imaging system comprises a color imager configured to provide a plurality of subimages, each subimage corresponding to a different illumination wavelength or range of illumination wavelengths; and
the multispectral image comprises the plurality of subimages.

12. The portable electronic device recited in claim 11 wherein the illumination source comprises a plurality of illumination sources at different wavelengths.

13. The portable electronic device recited in claim 1 wherein the instructions to perform the nonbiometric function comprise instructions to perform a nonbiometric function with both the illumination source and the imaging system.

14. A biometric measurement system comprising:
a platen;
an illumination source;
a light detector; and
a controller interfaced with the illumination source and the light detector, the controller including:
instructions to illuminate a purported skin site of an individual under a plurality of distinct optical conditions during a single illumination session while the purported skin site is moved over the platen;
instructions to derive a multispectral image of the purported skin site from light received by the light detector after scattering from the purported skin site for each of multiple of the plurality of distinct optical conditions while the purported skin site is moved over the platen; and
instructions to perform a biometric function with multispectral image.

15. The biometric measurement system recited in claim 14 wherein the instructions to derive the multispectral image of the purported skin site comprise instructions to generate a composite of a plurality of images derived for different portions of the purported skin site as the purported skin site is moved over the platen.

16. The biometric measurement system recited in claim 14 wherein the platen comprises a roller with which a position of the skin site relative to the light detector is moved.

17. The biometric measurement system recited in claim 16 wherein the platen is optically clear.

18. The biometric system recited in claim 14 wherein:
the illumination source comprises a first source disposed to illuminate the platen under total internal reflectance conditions; and
the instructions to illuminate the purported skin site comprise instructions to illuminate the platen with the first source such that the skin site is illuminated indirectly.

19. The biometric measurement system recited in claim 18 wherein:
the illumination source further comprises a second source disposed to illuminate the skin site directly; and
the instructions to illuminate the purported skin site further comprise instructions to illuminate the skin site directly with the second source.

20. The biometric measurement system recited in claim 14 wherein:
the light detector comprises a color imager configured to provide a plurality of subimages, each subimage corresponding to a different illumination wavelength or range of illumination wavelengths; and
the multispectral image comprises the plurality of subimages.

21. The biometric measurement system recited in claim 20 wherein the illumination source comprises a plurality of illumination sources at different wavelengths.

22. A method of performing a biometric measurement on an individual, the method comprising:
illuminating a purported skin site of the individual under a plurality of distinct optical conditions during a single illumination session while the purported skin site is moved over a platen;
receiving light scattered from the purported skin site separately for each of multiple of the plurality of distinct optical conditions while the purported skin site is moved over the platen to derive a multispectral image of the purported skin site; and
performing a biometric function with the multispectral image.

23. The method recited in claim 22 further comprising generating a composite of a plurality of images derived for different portions of the purported skin site as the purported skin site is moved over the platen to derive the multispectral image.

24. The method recited in claim 22 wherein the purported skin site is moved over the platen by rolling the purported skin site over a roller comprised by the platen.

25. The method recited in claim 22 wherein illuminating the purported skin site comprises illuminating the platen with a first source under total internal reflectance conditions to illuminate the skin site indirectly.

26. The method recited in claim 25 wherein illuminating the purported skin site further comprises illuminating the skin site directly with a second source.

27. The method recited in claim 22 wherein the purported skin site is in contact with the platen.

28. The method recited in claim 22 wherein the purported skin site is not in contact with the platen.

* * * * *